J. DINEEN.
CUSHION TIRE.
APPLICATION FILED JUNE 13, 1918.

1,277,396.

Patented Sept. 3, 1918.
2 SHEETS—SHEET 1.

Witnesses:

Inventor
John Dineen
by Clarence E. Mehlhope, Atty

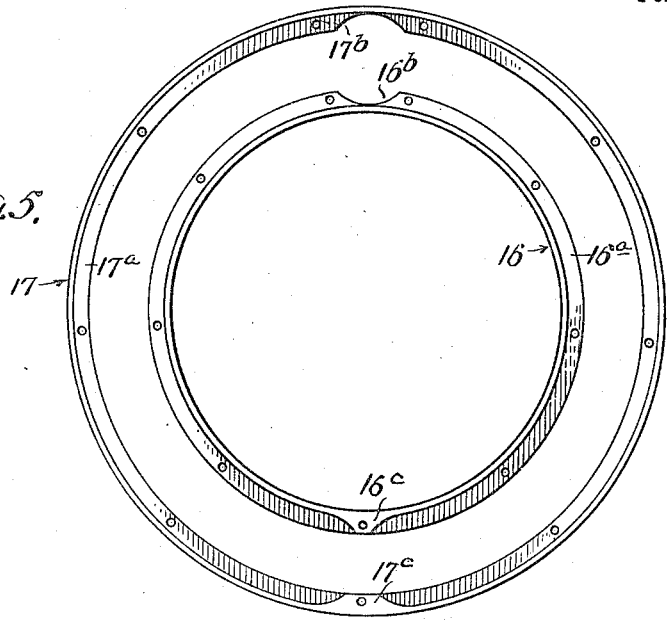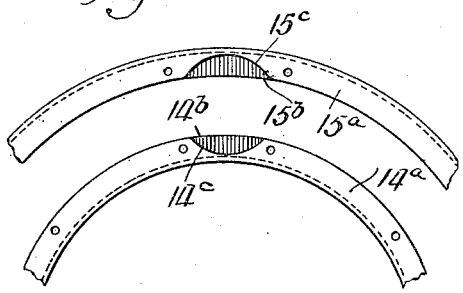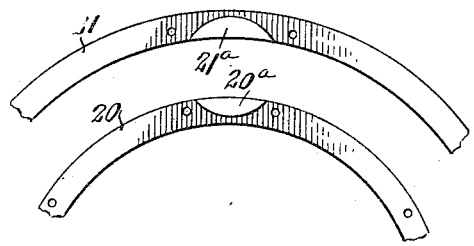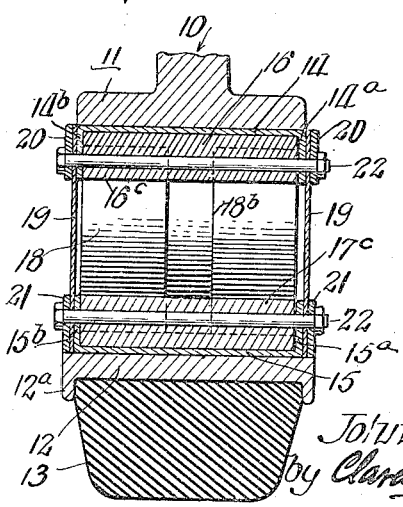

UNITED STATES PATENT OFFICE.

JOHN DINEEN, OF CHICAGO, ILLINOIS.

CUSHION-TIRE.

1,277,396. Specification of Letters Patent. Patented Sept. 3, 1918.

Application filed June 13, 1918. Serial No. 239,745.

*To all whom it may concern:*

Be it known that I, JOHN DINEEN, a citizen of the United States, and a resident of Chicago, in the county of Cook and State of Illinois, have invented certain new and useful Improvements in Cushion-Tires; and I do hereby declare that the following is a full, clear, and exact description thereof, reference being had to the accompanying drawings, and to the letters of reference marked thereon, which form a part of this specification.

The invention relates to improvements in cushion tires for vehicle wheels and consists of the matters hereinafter described and more particularly pointed out in the appended claims.

One of the objects of the invention is to provide a cushion tire construction which is easy to assemble and which will be efficient in operation for its intended purpose.

Another object of the invention is to so construct the tire that the cushion blocks forming a part thereof, are held against accidental movement in any direction without impairing the compression and expansion of said blocks in their operation.

A further object of the invention is to so construct the tire that the cushion blocks thereof are entirely inclosed and fully protected against the action of dirt and water.

These objects as well as the several advantages of my improved cushion tire construction will be more apparent as I proceed with my specification.

In the drawings:—

Figure 1 represents a view in side elevation of a vehicle wheel to which a cushion tire embodying my invention has been applied, parts thereof being shown as broken away to more clearly illustrate the interior construction of the tire.

Figs. 2 and 3 represent on an enlarged scale, transverse, sectional views through the tire, the planes of the section being indicated by the lines 2—2 and 3—3 respectively of Fig. 1.

Fig. 5 represents a view in side elevation of annular bands forming a part of my improved cushion tire.

Fig. 6 represents a view in side elevation of fragments of annular channel bars used in my improved tire construction.

Fig. 7 represents a view in side elevation of fragments of flat, metallic rings used in my improved tire construction.

Fig. 8 represents, on an enlarged scale, another transverse sectional view through the tire, the plane of the section being indicated by the line 8—8 of Fig. 1.

Figures 1, 2, 3, 4:
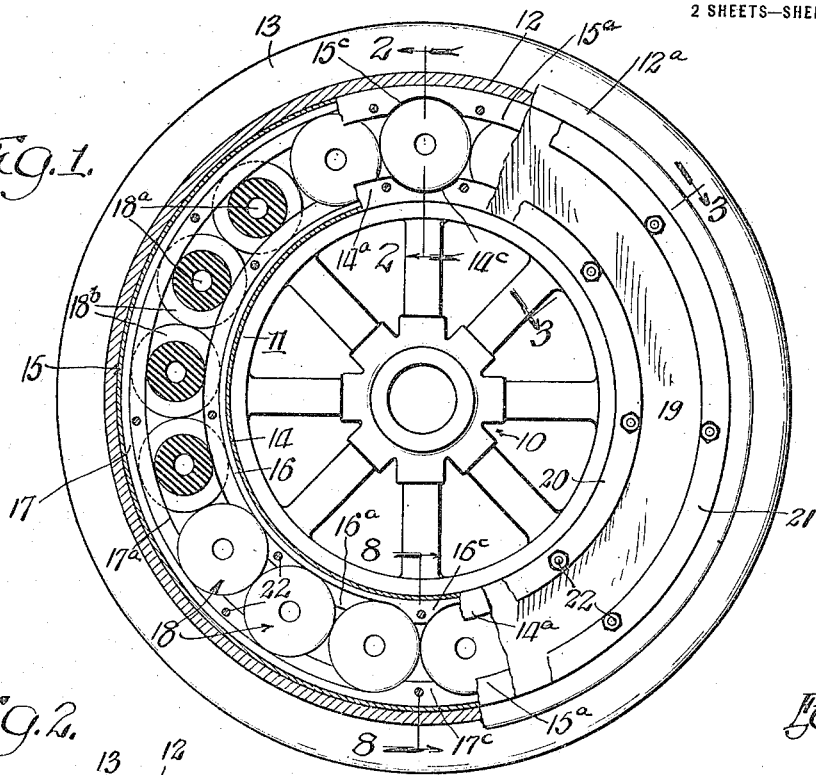
Fig. 4 represents a perspective view of one of the cushion blocks forming a part of my improved cushion tire.

Referring now in detail to that embodiment of my invention illustrated in the accompanying drawings:—10 indicates as a whole, a wheel having a felly 11. Said wheel as shown in this instance, is a cast metal wheel, but as will be apparent, my improved cushion tire construction is also adapted for use in connection with a wheel "built up" of the usual parts, such as a hub, spokes, and a felly.

The felly 11 has a flat periphery and associated with and radially spaced a suitable distance therefrom, is an annular tire band 12, which, as shown in this instance, has side flanges $12^a$. The outer periphery of said tire band and the said flanges define a channel to receive a suitable traction tread 13 such as a solid rubber tire.

Associated with and mounted on the wheel felly 11, is an annular channel member 14 which has radially outward extending, side flanges $14^a$, $14^b$. Associated with and mounted within the tire band 12 is a similar channel member 15 which has radially inward extending side flanges $15^a$, $15^b$, arranged in the plane of the side flanges $14^a$, $14^b$ before mentioned. The said channel members 14 and 15 respectively, have a driving fit with respect to the associated wheel felly 11 and tire band 12.

Within the channel member 14 between its side flanges $14^a$, $14^b$, is provided an annular band 16 that has a centrally arranged, outwardly extending, radial rib $16^a$ which is continuous except for a space $16^b$, the purpose of which will presently appear. On said band 16, preferably diametrically opposite the space $16^b$ is a transverse shoulder $16^c$ which is of the height of the rib $16^a$ and which extends across the width of the band. Within the channel member 15 is a similar band 17 that has a centrally arranged, inwardly extending radial rib $17^a$ which is also continuous, except for a space $17^b$ arranged opposite the space $16^b$ in the rib $16^a$. On the band 17 is a transverse shoulder $17^c$ which is arranged opposite the shoulder $16^c$ before mentioned. The side flanges $14^b$, $15^b$ of the channels 14 and 15 respectively, on one side of the wheel, are continuous, while the side flanges 14ª, 15ª on the other side of the wheel, are cut away to provide spaces 14°, 15° which, when the tire and wheel are assembled, register with the spaces 16ᵇ and 17ᵇ in the ribs on the bands 16 and 17 respectively.

In the annular space between and defined by the bands 16 and 17, are placed a plurality of compressible and expansible cushion blocks of rubber or the like, which are preferably in the forms of cylinders (see Fig. 4) each having an axially arranged hole 18ª and a groove 18ᵇ in its periphery midway between its ends. The cushion blocks 18 are of a diameter equal to the distance between the opposed surfaces of the bands 16 and 17 and are of a length equal to the width of said bands. To introduce the cushion blocks 18 into the annular spaces between the bands 16 and 17, a cushion block 18 is inserted through the spaces 14° and 15° in the side flanges 14ª and 15ª until the inner or entering end of said block engages the opposite side flanges 14ᵇ and 15ᵇ, which as before mentioned, are continuous flanges. With the cushion block in this position, the groove 18ᵇ thereof will register with the central ribs on said annular bands 16 and 17 and the said block is moved around in said annular channel between said bands until it engages the transverse shoulders 16° and 17° of said bands.

The next cushion block to be introduced, is inserted in the same manner but moved in the opposite direction toward the cushion block already in place until said second cushion block engages the opposite sides of said shoulders 16° and 17° respectively. The desired number of cushion blocks are introduced as just described and the last cushion block to be inserted will be arranged co-axially with respect to the spaces in said side flanges and in the central ribs before mentioned.

To lock said last inserted cushion block in place and to inclose all said cushion blocks so that they will in no way be exposed, and so that no dirt, dust or water can enter the space occupied by said cushion blocks, I provide on each side of the wheel a flat ring 19 of flexible waterproof material which is fixed to the side flanges of the channel members 14 and 15 as will soon appear.

20 and 21 indicate radially spaced, flat metallic rings which are of diameters corresponding to the diameters of the channel bars and which engage with said side flanges with the flat, flexible rings 19 between them. Bolts 22 extend through said flat rings, through said flexible rings, the side flanges of the channels 14 and 15 and through the central ribs 16ª and 17ª, to hold said parts together in proper position and to clamp the flexible rings to the side flanges of said channel members. Said bolts of course are so located as to pass between the cushion blocks and in no way interfere with their compression and expansion in their actual operation.

The rings 20 and 21 on one side of the wheel have lugs 20ª, 21ª on their inner surfaces (see Fig. 7), which are adapted to fill up the space in the associated side flanges 14ª, 15ª respectively, to close said spaces so as to prevent any shifting of the last cushion block inserted in place.

The operation of my improved cushion tire is apparent from the foregoing description. The shock and jar imparted to the wheel as it travels over uneven roadway surfaces, are absorbed by the cushion blocks which are compressed in the line of force exerted by reason of the engagement of said wheel with said uneven roadway surfaces. The blocks in their cylindrical form provide for the necessary compression and expansion and should it be desired or be found necessary, the metallic rings 20, 21, together with the flexible rings on one side of the wheel, may be removed and the cylindrical cushion blocks may be shifted or turned to bring new contact surfaces into engagement with each other and with the annular bands 16 and 17 and thus compensate for any permanent distortion of said cushion blocks.

The cushion blocks being inclosed, cannot be affected by the action of dirt, dust and water, and will last for a long time without disintegration. The stop shoulders 16° and 17° will prevent any rolling movement of the several cushion blocks and any rotative movement between the wheel felly and tire band. The engagement of the central ribs on the annular bands 16 and 17, together with the engagement of the side flanges of the channel members 14 and 15 with the ends of said cushion blocks will prevent any lateral distortion of the wheel felly with reference to the tire band so that the wheel at all times will run perfectly true.

My improved cushion tire provides all of the advantages of a pneumatic tired wheel without the usual attending disadvantages thereof, such as punctures and blow-outs.

While in describing my invention, I have referred to certain details of construction and arrangement of parts, it is to be understood that the invention is in no way limited thereto except as may be pointed out in the appended claims.

I claim as my invention:

1. A cushion tire, comprising in combination with a wheel felly, and a tire band spaced radially from said felly, a plurality of cushion-blocks interposed between said wheel felly and said tire band, means providing radially spaced ribs fixed with respect to said wheel felly and to said tire band in a plane intermediate the edges thereof, said ribs being continuous except for a space to permit the insertion of one of the cushion-blocks between said wheel felly and said tire band, each cushion-block being provided with a groove for engagement with said ribs, and means for locking the last inserted cushion-block in place.

2. A cushion tire comprising in combination with a wheel felly, and a tire band spaced radially from said felly, a plurality of cylindrical cushion-blocks interposed between said wheel felly and said tire band, means providing radially spaced ribs fixed with respect to said wheel felly and to said tire band in a plane intermediate the edges thereof, said ribs being continuous except for a space to permit the insertion of one of said cylindrical cushion-blocks between said wheel felly and said tire band, each cylindrical cushion block having a groove for engagement with said ribs, means associated with said radial ribs providing stop shoulders for said cushion blocks at a point spaced arcuately from the insertion space thereof, and means for locking the last inserted cushion-block in place.

3. A cushion tire comprising in combination with a wheel felly and a tire band spaced radially from said felly, a plurality of cylindrical cushion blocks interposed between said wheel felly and tire band, means providing radially spaced, central ribs and radially spaced side flanges fixed with respect to said wheel felly and said tire band, said ribs and said flanges on one side of the wheel felly and tire band being continuous except for a space to permit of the insertion of one of said cushion-blocks between said wheel felly and tire band, each cylindrical cushion block having a groove for engagement with said radially spaced central ribs, and means for closing the insertion space in said side flanges to lock the last inserted cushion-block in place.

4. A cushion tire comprising in combination with a wheel felly and a tire band spaced radially from said felly, a plurality of cylindrical cushion blocks interposed between said wheel felly and tire band, means providing radially spaced, central ribs and radially spaced side flanges fixed with respect to said wheel felly and said tire band, said ribs and said flanges on one side of the wheel felly and tire band being continuous except for a space to permit the insertion of one of said cushion-blocks between said wheel felly and tire band, each cylindrical cushion-block having a groove for engagement with said radially spaced central ribs, stop shoulders associated with said radial ribs and said side flanges, preventing said cushion-blocks from rolling on said felly, and means closing the insertion space in said side flanges and locking the last inserted cushion-block in place.

5. A cushion tire comprising in combination with a wheel felly and a tire band spaced radially from said felly, a plurality of cylindrical cushion-blocks interposed between said wheel felly and tire band, means providing radially spaced central ribs and radially spaced side flanges fixed with respect to said wheel felly and said tire band, said ribs and said flanges on one side of the wheel felly and tire band being continuous except for a space to permit of the insertion of one of said cushion-blocks between said wheel felly and tire band, each cylindrical cushion-block having a groove for engagement with said radially spaced central ribs, flat, flexible rings engaging the said side flanges and inclosing the ends of said cushion-blocks, flat metallic rings engaging the flat, flexible rings to hold them in engagement with said side flanges, said flat metallic rings on one side of the wheel having lugs for closing the insertion space in said side flanges, and bolts extending through all of said rings and through said central ribs and side flanges, but between said cushion-blocks for holding said rings in proper position.

6. A cushion tire comprising in combination, a wheel felly and a tire band radially spaced from said wheel felly, channel members having radial side flanges mounted on said wheel felly and on said tire band respectively, annular bands having centrally arranged ribs, fixed within said channels, a plurality of cylindrical cushion-blocks interposed between said annular bands and engaging at their ends with said side flanges, said central ribs and the side flanges on one side of the wheel being continuous except for a space to permit the insertion of said cushion-block, each cushion-block having a groove to engage said central ribs on said annular bands, flat, flexible rings engaging the outer surfaces of said side flanges and inclosing the ends of said cushion-blocks, flat, metallic rings, one associated with each side flange, said metallic rings holding said flexible rings to said side flanges, said flat metallic rings closing the insertion space in said side flanges, and bolts extending through said rings, flanges and central ribs to hold said rings in proper position relative to said side flanges.

In testimony that I claim the foregoing as my invention, I affix my signature in the presence of two witnesses, this 10th day of June, A. D. 1918.

JOHN DINEEN.

Witnesses:
T. H. ALFREDS,
D. DARRENOUGUE.